(12) United States Patent
McCarthy et al.

(10) Patent No.: US 7,228,546 B1
(45) Date of Patent: Jun. 5, 2007

(54) DYNAMIC MANAGEMENT OF COMPUTER WORKLOADS THROUGH SERVICE LEVEL OPTIMIZATION

(75) Inventors: Clifford A. McCarthy, Dallas, TX (US); Raja Daoud, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/493,753

(22) Filed: Jan. 28, 2000

(51) Int. Cl.
*G06F 9/46* (2006.01)

(52) U.S. Cl. ...................................... 718/104; 718/103

(58) Field of Classification Search ........ 718/100–108, 718/1
See application file for complete search history.

(56) References Cited

U.S. PATENT DOCUMENTS

| | | | | |
|---|---|---|---|---|
| 5,473,773 | A * | 12/1995 | Aman et al. ................ | 718/104 |
| 5,675,739 | A * | 10/1997 | Eilert et al. ................. | 709/226 |
| 6,424,873 | B1 * | 7/2002 | Przybylski ................... | 700/42 |
| 2002/0129048 | A1 * | 9/2002 | Qiu et al. .................... | 707/204 |

OTHER PUBLICATIONS

Steere, David C. et al. "A Feedback-driven Proportion Allocator for Real-Rate Scheduling", Sep. 1998, OGI CSE Technical Report 98-014, pp. 1-14.*

Stankovic, John A. et al., "The Case for Feedback Control Real-Time Scheduling", 1999, Dept. of Computer Science, University of Virginia, pp. 1-10.*

*Automatic Control Systems* by Benjamin C. Kuo, 1982, pp. 471-483.

* cited by examiner

*Primary Examiner*—Lewis A. Bullock, Jr.
*Assistant Examiner*—Kenneth Tang (57) ABSTRACT

The inventive work load manager (WLM) dynamically responds to changes in workload characteristics. The WLM bases response on performance goals set by the administrator, and manipulates the resources to achieve these goals. The WLM receives performance information from performance monitors. The WLM examines the information from the performance monitors and compares the information with the goals using a Proportional Integral and Derivative controller. Based on the comparison, the WLM may increase, decrease, or leave unchanged, the resources devoted to an application. If the performance of an application is performance is lagging, e.g., if transactions are taking longer than the goal, then the WLM increases the entitlement. If an application is over-achieving, then the WLM will decrease its entitlement and allocate it to another application. The WLM uses an arbiter which allocates the resources between the different applications, based on the priorities of the applications. Consequently, the WLM creates a feedback loop between application performance and CPU entitlements.

20 Claims, 7 Drawing Sheets

| APPLICATIONS | A | B | C | D | E | F |
|---|---|---|---|---|---|---|
| PRIORITY | 1 | 2 | 3 | 3 | 3 | 4 |
| REQUEST | 40 | 29 | 20 | 20 | 20 | 35 |
| ALLOCATION | 40 | 29 | 10 | 10 | 10 | 1 |

FIG. 10A

| APPLICATIONS | A | B | C | D |
|---|---|---|---|---|
| PRIORITY | 3 | 3 | 3 | 2 |
| REQUEST | 20 | 20 | 20 | 43 |
| PREVIOUSLY ASSIGNED | 10 | 1 | 15 | 1 |
| NEWLY ALLOCATED | 9 | 18 | 4 | 42 |
| TARGET | 19 | 19 | 19 | 43 |

```
   A         B            C
  10         1           15
  31 LEFT  ─────▶   10 IS TARGET
  10        10           15
  22 LEFT  ─────▶   15 IS TARGET
  15        15           15
  12 LEFT  ─────▶   20 IS TARGET
  19        19           19
```

*FIG. 10B*

| APPLICATIONS | A | B | C | D |
|---|---|---|---|---|
| PRIORITY | 3 | 3 | 3 | 2 |
| REQUEST | 25 | 15 | 30 | 33 |
| PREVIOUSLY ASSIGNED | 10 | 12 | 20 | 1 |
| NEWLY ALLOCATED | 15 | 3 | 7 | 32 |
| TARGET | 25 | 15 | 27 | 33 |

*FIG. 11A*

```
   A         B            C
  10        12           20
  25 LEFT  ─────▶   TARGET IS 12
  12        12           20
  23 LEFT  ─────▶   TARGET IS 15
  15        15           20
  17 LEFT  ─────▶   TARGET IS 20
  20        15           20
  12 LEFT  ─────▶   TARGET IS 25
  25        15           25
   2 LEFT  ─────▶   TARGET IS 30
  25        15           27
```

| | | |
|---|---|---|
| R1=33.5 | S1=R1+0=33.5 → 34 | R1'=S1−0=34 |
| R2=33.5 | S2=R1+R2=67.0 → 67 | R2'=S2−S1=33 |
| R3=33.0 | S3=R1+R2+R3=100.0 → 100 | R3'=S3−S2=33 |

FIG. 12B

| | | |
|---|---|---|
| R1=10.1 | S1=R1+0=10.1 → 10 | R1'=S1−0=10 |
| R2=20.2 | S2=R1+R2=30.3 → 30 | R2'=S2−S1=20 |
| R3=30.3 | S3=R1+R2+R3=60.6 → 61 | R3'=S3−S2=31 |
| R4=39.4 | S4=R1+R2+R3+R4=100.0 → 100 | R4'=S4−S3=39 |

FIG. 12C

DYNAMIC MANAGEMENT OF COMPUTER WORKLOADS THROUGH SERVICE LEVEL OPTIMIZATION

TECHNICAL FIELD

This application relates in general to computer systems, and in specific to dynamic allocation of computer resources among applications.

BACKGROUND

Figure 1A:
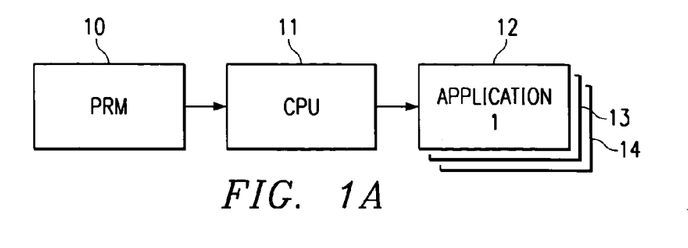
FIG. 1A depicts a prior art resource manager.
Figure 1B:
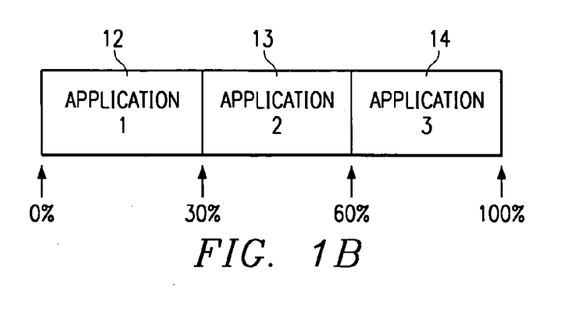
FIG. 1B depicts the portioning of the applications.

Computer systems inherently have limited resources, particularly CPU resources. These limited resources must be allocated among the different applications operating within the system. A prior allocation mechanism for allocating system resources to applications is a system known as Process Resource Manager (PRM) 10 as shown in FIG. 1A. It is used to partition the CPU resource 11 and various other resources among the different applications 12, 13, 14. The PRM partitions the resources into fractions of the whole, which are expressed as percentages in PRM configuration, as shown in FIG. 1B. The fractions or pieces are then assigned to groups of processes, which comprise applications. Each application would then receive some portion of the available resources, particularly the CPU.

The PRM is a static mechanism, meaning that the allocation configuration is fixed by an administrator, and can only be changed by an administrator. In other words, the administrator specifies where the partitions should lie, i.e., what percent of the machine goes to application 12, application 13, and application 14. This information is fixed, so what it cannot do is respond to changes in the needs of the different applications. For example, one application may be mostly idle, but occasionally has a large amount of work to do. Under the static mechanism with fixed entitlements, this application would be allocated a smaller fraction of the CPU resources, as a larger fraction can not be justified because of the large amount of idle time. Consequently, when the large amount of work is received, then the application's performance will suffer because of its low entitlement. Therefore, the transactions will take longer to process. Another example is where a transaction requires large amounts of resources for extended periods of time, but also has periods of idle time. Under the static mechanism with fixed entitlements, this application would be allocated a larger fraction of the CPU resources. Consequently, when this application is idle, other applications' performances will suffer, as this application is assigned a large amount of resources that are not being used, and thus are not available for other applications. Therefore, the other transactions will take longer to process. Thus, this mechanism cannot handle changes in the requirements of the different applications.

Another problem is the partitioning the resources by the administrator. The administrator has to think in terms of the actual machine resources and the requirements of the different applications. This is problematic because the resources and applications are operating at a lower level than what a person typically views. Moreover, the administrator has to have a great deal of knowledge of the application's characteristics and its resource requirements in order to determine where to set the partitions. Lack of knowledge is typically made up with guesswork. For example, an administrator may choose to set application 13 at 20% of the CPU resources. If the users of the system complain, the administrator may change the value later on.

An alternative mechanism is taught in patent by IBM, U.S. Pat. No. 5,675,739, which is hereby incorporated by reference. The IBM mechanism uses a priority-based model to process application. In other words, high priority applications are serviced from a queue before lower priority application. This mechanism can change the priorities to adjust processing performance.

Therefore, there is a need in the art for a non-static system that does not suffer from the problems discussed above, but allows for partitioning of the resources among the different applications.

SUMMARY OF THE INVENTION

These and other objects, features, and technical advantages are achieved by a system and method that dynamically responds to changes in workload characteristics. The inventive mechanism also allows the administrator to think in terms of performance goals rather than machine resources and requirements. Consequently, the administrator defines a variety of performance goals with different priorities between them, and the inventive mechanism will make any necessary adjustment of the resources. For example, a goal for a database could be that a retrieval transaction should not take more than 10 milliseconds. The inventive mechanism would then manipulate the resources to achieve this goal.

The inventive mechanism includes a work load manager (WLM) that receives goal information and priority information from a user or administrator. The WLM also receives performance information from performance monitors, which are processes that monitor the performance of the applications. The WLM examines the information from the performance monitors and compares the information with the goals. Based on the comparison, the WLM may increase, decrease, or leave unchanged, a partial application's partition. If the performance of an application is lagging, e.g., if transactions are taking longer than the goal, then the WLM increases the entitlement. If an application is over-achieving, then the WLM will decrease its entitlement and allocate it to another application.

To perform the comparison between the goals and the performance information, the WLM uses a control system that is common in control theory known as a Proportional Integral and Derivative controller, or PID controller. For further information in PID controllers, please see the reference by Benjamin C. Kuo entitled "Automatic Control Systems", 4$^{th}$ ed., 1982, Prentice-Hall Inc., Englewood Cliffs, N.J., 07632, ISBN 0-13-054817-0, which is incorporated herein by reference, particularly chapter 8.2. The proportional component will make large changes to the entitlements if there are large differences between the entitlements and the goals, and will make small changes to the entitlements if there are small differences between the entitlements and the goals. Tuning provides the proportionality between the change to the entitlement and the difference between the goal and the entitlement. For example, if the tuning constant is 10, then a one second difference would result in a 10% change, while a two second difference would result in a 20% change. The derivative component is used to detect and compensate for 'ramping' changes. For example, if a transaction is taking 6 seconds, then 7 seconds, and then 8 seconds, the proportional controller will never catch up with the difference. The integral controller stabilizes the effects of the proportional controller and the derivative controller and eliminates any steady-state error.

The invention applies PID control principles to workload management for discrete operations, e.g. intervals of time.

The invention creates a feedback loop between application performance and CPU entitlements. Based on the reported information, the invention makes changes to the entitlements of the application to meet the stated goals. The changes will modify the performance of the application to bring the performance closer to the stated goals. The amount or magnitude of the changes is based on the tuning inputs. If the application's needs are not changing, then the invention will modify the entitlements to automatically settle in to the resource configuration that gives the application what it needs to achieve the goal. If the application's needs are changing, for example due to a change in its demand, system resources, or other factors, then the invention will react to any subsequent performance changes and bring the applications performance in line with the stated goals.

An arbiter allocates the resources between the different applications, based on the priorities of the applications. Applications of equal priority are treated equally. The requests of higher priority applications are satisfied before lower priority applications.

It is a technical advantage of the invention that entitlements are no longer a fixed configuration. As the application's needs change, the computer will automatically adjust entitlements based on what the user desired through the stated goals. This makes it into a dynamic system.

It is another technical advantage of the invention that an administrator no longer has to estimate the initial entitlements as the invention will determine the correct resource allocation to achieve the stated goal, and the system will converge on a certain entitlement value that achieves the stated performance goal.

It is a further technical advantage of the invention that priorities can be assigned to the different goals. Consequently, different goals can be met based on system resources, e.g., with a high amount of resources, all goals can be met, however, with a lesser amount of resources the higher priority goal will be met before the lower priority goals.

It is a still further technical advantage of the invention that changes to the system can be made as soon as the WLM detects performance changes, and action by the system administrator is not required.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Figure 2:
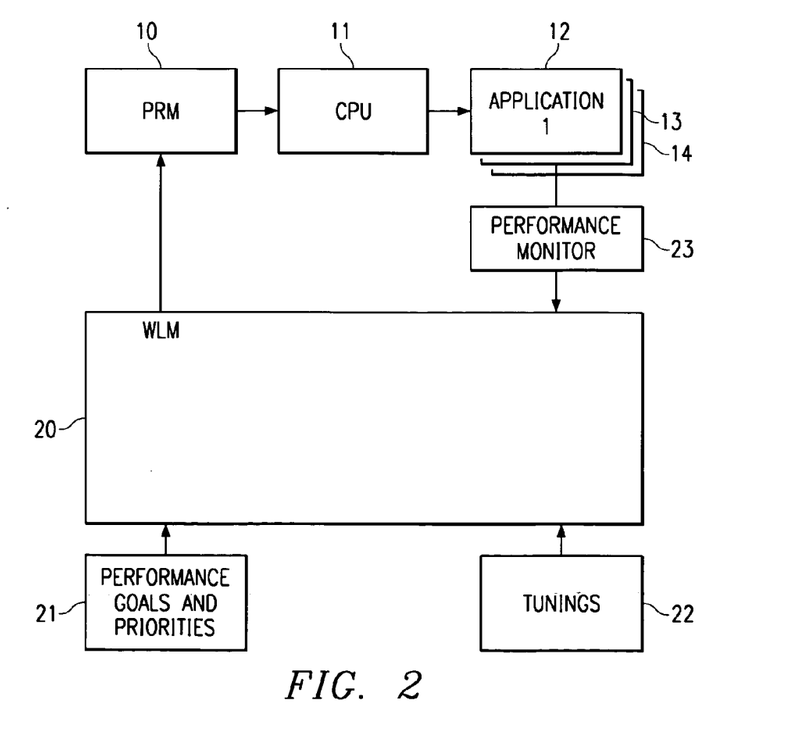
FIG. 2 depicts the inventive work load manager.

FIG. 2 depicts the various components of the inventive system, which includes performance goals 21. Goals 21 comprise a configuration file, which is defined by a user or system administrator, that describes the users preferences with regards to what characteristic(s) of the application is of interest and is being measured, what is the desired level of performance of the application in terms of the characteristic, and what is the priority of achieving this goal. A user can also specify time periods for a particular goal to be in effect. For example, a first application may be a first database and the user will specify in the configuration file that the characteristic is for a particular type of transaction to be completed within two seconds, and have a high priority. The application may also have a second goal for the same characteristic, e.g. the same type of transactions are to be completed within one half of a second, and have a low priority. A second application may be a second database which has a similar goal as that of the first database, namely for a particular type of transaction to be completed within two seconds, and have the same priority as the first database. Thus, resources would be partitioned between the two applications, so that the high priority goals will be met, and any excess resources would be given to the first application so that it can meet the lower priority "stretch" goal.

The WLM 20 also receives performance information which describes the status of a particular characteristic or characteristics of each application 12, 13, 14 that is being monitored. This information is supplied by performance monitor 23. As shown in FIG. 2, a single monitor is capable of handling multiple applications, however, a different embodiment of the present invention may have multiple monitors, each monitoring one or more applications. The performance monitor 23 is a small program that gathers specific information about the application. For example, if the application is a database, then a performance monitor measures access times for the database. This information is being gathered continuously while the system is operating. The workload manager will sample the information at some interval specified by the administrator.

The output of the workload manager, derived from the ongoing performance reported by the monitor and given the goals the user, is periodically applied to the PRM 10. The output of the WLM 20 is the share or entitlement allocation to the different resources that is assigned to each application. Generally, each percentage approximately equates to 1/100 of a CPU operating second. Thus, within a second, an application having an entitlement of 10 will receive ¹/₁₀ of the second, provided that the application has at least one runable process. Note that the time received may not be consecutive, but rather may be distributed across the one second interval.

The system may have multiple CPUs. Thus, the allocation can be placed all on one processor, one each processor, or on a portion of the processors. For example, a ten percent allocation in a four processor system could result in forty percent of one processor, ten percent of each processor, twenty percent of two processors, or some other allocation. The allocation among the different processors is determined by the PRM 10. The PRM will move the application around to various CPUs, as needed to attempt to ensure that it achieves ten percent. Therefore, if the application has only one runable thread, so that it can only execute on one CPU, then PRM will attempt to give it 20% of one CPU (on a two CPU system), so that is 10% of the total universe of CPU availability that is out there. Multi-threaded applications can be assigned to more than one CPU. The allocation allows the application to perform its programmed tasks. How fast and efficient it performs its tasks is a reflection of how much CPU time it was allocated. The less CPU it is allocated, the less it will perform in a time period. The more CPU it is allocated, the more it will perform in a time period. The performance monitor will measure its performance, which will be sampled by the WLM, thus completing the feedback of the system.

The workload manager accomplishes its tasks by comparing the information from the performance monitor with the goal the specified by the user. As stated before, there may be multiple goals for a single application. An easy goal and a stretch goal is one way of looking at this situation. There is one PID controller instance created within the workload manager for each goal that they are trying to achieve. Some instances may be looking at the same stream of performance data and reacting to it in different ways, depending on what they are trying to achieve. For example, if you look at the database performance as the characteristic being measured, then one PID controller may be trying to get that characteristic to two seconds, while the other controller is trying to reduce it one second.

Each PID instance performs the proportional-integral-derivative calculation on the received data to determine an R-value. The PID instance calculates $R_i=(KP \times P_i')+(KD \times D_i)+(KI \times I_i)+R_i old$. KP, KD, KI, are tuning constants 22 set by the user or administrator of the system.

The $(KP \times P_i')$ factor of the R equation represents the proportional contribution to the R value. KP is a tuning constant 22. $P_i'$ is a value for the difference between the goal and the measured result, and is calculated as follows. $P_i$ is the current value of the metric or characteristic for a particular goal "i", and $V_i$ is the desired value or goal for that metric. For example, using the database example, $P_i=1.8$ sec/transaction, and $V_i=2$ sec/transaction is the goal. $P_i'$ equals $P_i-V_i$. Note that this assumes that the comparison operator (the '=' in $V_i=2$) is "less than", meaning that an increase in entitlement shares will decrease the service level, i.e. decrease the measurement (see FIGS. 4 and 5). This may be indicated by showing the '=' sign of the goal, e.g. $V_i=2$, be depicted as '≦' for an expression of $V_i \leq 2$. However the goal would still be to have the characteristic approximately equal 2. If the operator is "greater than", meaning that an increase in entitlement shares will increase service level, i.e. increase the measurement, then $P_i'$ equals $V_i-P_i$. To indicate a "greater than" comparison operator a '≧' would be used. Note that another way of viewing "greater than" and "less than" is that "greater than" means good performance has larger numbers, and "less than" means good performance has small numbers. Generally, time-based characteristics are "less than" meaning the shorter the time, the better the performance, whereas transactions per second characteristics are "greater than" where the larger the number the better the performance. The value of KP reflects the aggressiveness of the user or administrator in addressing a problem. As the service level deviates, a large value of KP (aggressive) will provide for a big change to try to return to the goal quickly, while a small value of KP (conservative) will provide for a small change which causes a slower return to the goal. In other words, KP controls convergence. The choice of that value is based on some empirical information about the range of possible performance levels that we can get out of the performance monitor. For further information, please see the reference by Benjamin C. Kuo entitled "Automatic Control Systems", 4$^{th}$ ed., 1982, Prentice-Hall Inc., Englewood Cliffs, N.J., 07632, ISBN 0-13-054817-0, which is incorporated herein by reference.

The $(KI \times I_i)$ factor of the R equation represents the integral contribution to the R value. KI is a tuning constant 22. $I_i$ is a value for that accumulates previous proportional results over time, and is calculated as follows. $I_i=(I_i old \times IH_i)+P_i'$. $I_i$old is the stored, previous value for $I_i$. $IH_i$ is an integral history constant, which is another tuning constant 22. The integral history term should be a value between 0 and 1, inclusive, and serves to make older values contribute less to the integral contribution as time passes. Note that each time it is being multiplied by another factor of $IH_i$, so the value is exponentially shrinking each iteration's contribution as time passes. This factor accumulates the $P_i'$ terms by adding old values with the new value. This integrates the difference between the service level and the goal over time. This factor is useful if the service level is a little bit off over a long amount of time, as this factor will eventually add up to bring the service level up/down to the goal. KI should be selected to properly set the effects of the integration factor. For further information, please see the reference by Benjamin C. Kuo entitled "Automatic Control Systems", 4$^{th}$ ed., 1982, Prentice-Hall Inc., Englewood Cliffs, N.J., 07632, ISBN 0-13-054817-0, which is incorporated herein by reference. An analogy is in the frequency domain, KI and KD will form a bandpass filter. As the data comes in, noise (high-low fluctuations in the measurements) which should be disregarded. The correct choice of KI and KD will provide a system that is more appropriately tuned for the nature of that data coming in, and is not necessarily responding to short impulse changes in the measurements.

The $(KD \times D_i)$ factor of the R equation represents the derivative contribution to the R value. KD is a tuning constant 22. $D_i$ is a value for that represents changes in proportional values over time, in other words, how fast the value is changing, and is calculated as follows. $D_i=(P_i'-P_i'old)/t$. $P_i'$old is a previous stored value for $P_i'$. t is time difference between the measurements used to calculation $P_i'$ and $P_i'$old, e.g. the interval sample time or the time between adjustment operations of the system. This factor is useful in adjusting the entitlements when the service level is changing over time. The factor determines how much extra impulse to add to the proportional factor, when the curve is beginning to change. For example, if the application is increasingly being used over time (ramping up), then more CPU time (via entitlements) would need to be devoted to the application for goals to be satisfied. Using only proportionality, the system would lag behind demand, however the derivative factor would then provide the extra boost needed to catch up with demand. KD sets the value of the 'extra boost', depending on the steepness in the changes in the curve. Note that there is an assumption that the curve is moving in a certain direction, and thus, the steeper the curve, the higher the next value. KD should be selected to properly set the effects of the derivative factor. For further information, please see the reference by Benjamin C. Kuo entitled "Automatic Control Systems", $4^{th}$ ed., 1982, Prentice-Hall Inc., Englewood Cliffs, N.J., 07632, ISBN 0-13-054817-0, which is incorporated herein by reference.

The values for the proportional, integral, and derivative components are then added to the stored previous value for R, $R_i$old. The result is the R value for the particular goal, $R_i$. The PID controller would calculate one such value for each goal.

Figure 3:
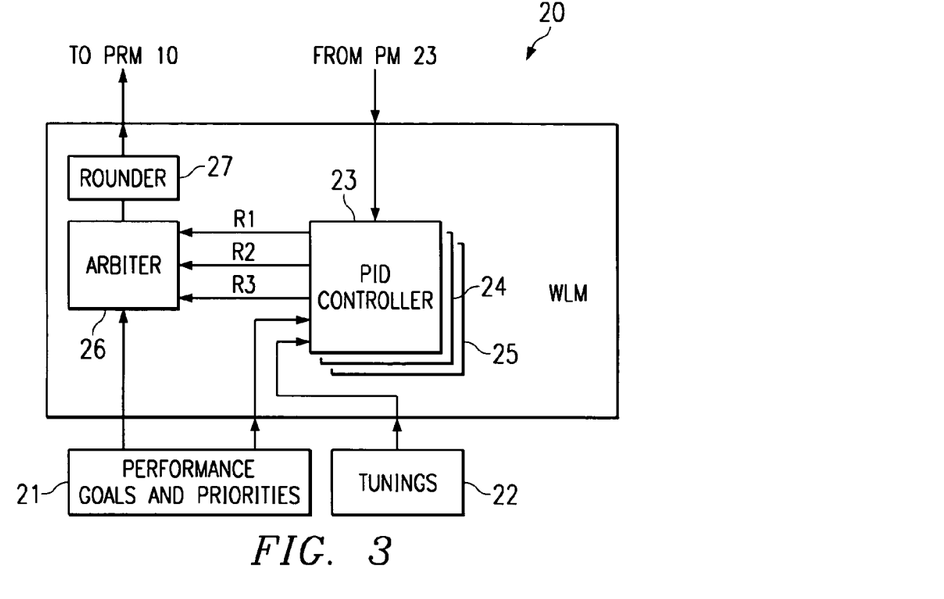
FIG. 3 depicts the components of the inventive work load manager of FIG. 2.

After computations of the requirements or R values, R1, R2, R3, the PID controllers 24, 24, 25 pass the R values to the arbiter 26. In a system where the CPU resources outweigh the needs of the applications running on the system, then an arbiter is not needed, as the R values can be directly provided to the PRM. However, in most systems, there are periods of time where the applications requirements outweigh system CPU resources. Therefore, an arbiter is need to decide which applications are allocated the resources. Note that the arbiter does not actually make the allocations, as this task is performed by the PRM. Instead, the arbiter receives the R-values from the PID controllers and then adjusts the R-values, if needed, to form adjusted R-values. These adjusted R-values are then provided to the PRM which makes the allocations.

Figure 8:
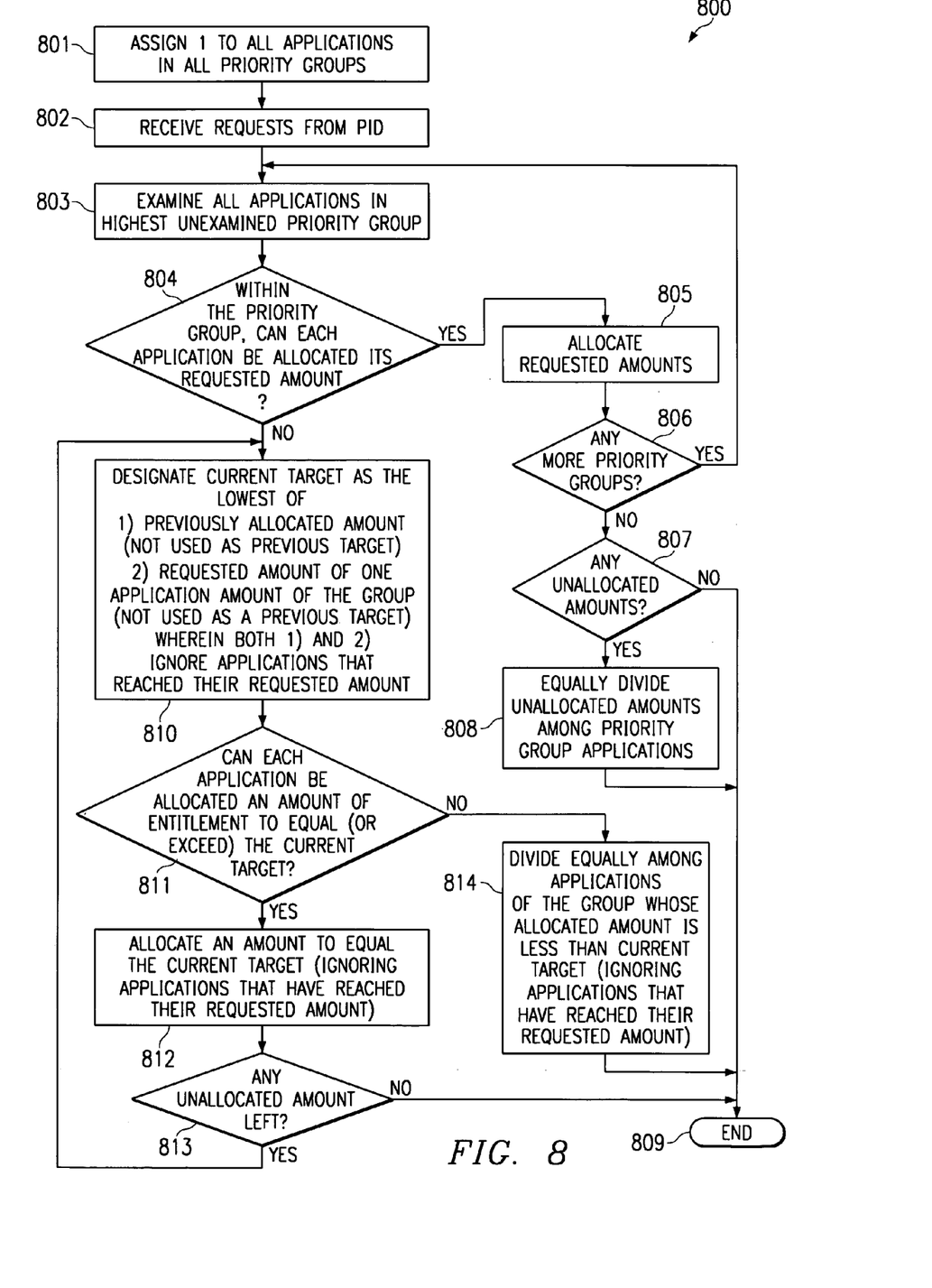
FIG. 8 depicts a flow chart of the operations of the arbiter of the work load manager of FIG. 3.

The arbiter operates according to the flow chart 800 of FIG. 8. Initially the arbiter assigns 801 all processes with the value 1 (hereinafter meaning 1% of CPU resources). The arbiter then samples 802 the requests or R values from the PID. The arbiter then examines 803 the requests associated with the applications in the highest priority group. It determines 804 whether the requested amount for each application within the priority group can be satisfied. If so, then the arbiter facilitates allocation 805 of the requested entitlement for each application by setting the adjusted R-values equal to the PID R-values, and passing the adjusted R-values to the PRM, see step 809. If not, then the arbiter arbitrates between the different applications in a fair manner, as discussed in step 810. After satisfying each application in step 805, the arbiter then determines 806 whether there are any more priority groups. If so, then the arbiter returns to step 803 and repeats. If not, then arbiter determines 807 whether any unallocated resources remain. If not, then the arbiter is finished 809. The allocated values are sent to the PRM, and the WLM is finished for this iteration. After a predetermined time period, the WLM will begin again, the WLM will sample values from the performance monitor, provide these values to the PID controllers, which in turn calculates the R values, which are then provided to the arbiter. If step 807 determines that resources are available, then the arbiter divides 808 the remaining resources equally among the applications of the all of the priority groups that have been examined. Step 808 assumes that the arbiter is set to distribute-all. Alternatively, the arbiter can be set to hoard-all excess entitlements, in which case, all remaining allocations would be assigned to an extra shares application which contains random processes not assigned priorities or in the priority groups. Note that hoarding may allow the invention to operate more properly, as the assignment of extra entitlements may cause the applications to over achieve their respective goals, and consequently cause the application to unnecessarily revise the R-values. Then the arbiter ends 809.

If the arbiter determines in step 804 that the requested amount for each application within the priority group cannot be satisfied, then the arbiter arbitrates between the different applications in a fair manner, by designating 810 a current target value as the lowest value of (1) the lowest of any previously allocated amounts (or adjusted values), wherein the previously allocated amounts have not been previously used a target value, or (2) the lowest requested amount (or R-value) of one application of the group, which has not been used for a previous current value. Note that criteria (1) and (2) do not include applications that have reached their requested amounts, as this will simplify the performance flow of the arbiter as depicted in FIG. 8 (namely, by reducing the number of times that steps 810, 811, 812, and 813 are repeated). Then the arbiter determines whether the target amount for each application within the priority group can be satisfied. If not, then the allocation amount is equally divided 814 among different applications of the priority group whose allocations are less than the current target, but excluding applications that already met or exceeded the target level. The arbiter then ends 809. If so, then the arbiter allocates 812 sufficient entitlements to bring the adjusted R-value of each application up to the target level. Applications that already meet or exceed the target level are not changed. The arbiter then determines 813 whether any unallocated entitlements remain. If not, then the arbiter ends 809. If so, then the arbiter returns to step 810 to determine a new current target level and repeats the process until the arbiter ends 809.

Figure 9:
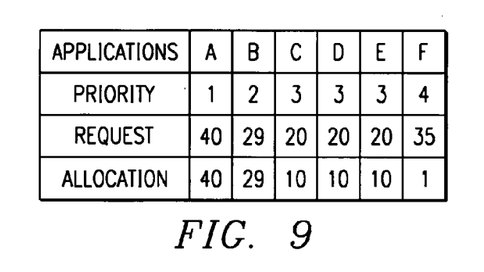
FIG. 9 depicts an example of allocation of entitlements by the work load manager of FIG. 2.

FIG. 9 is an example of the operation of the arbiter 26. As shown in FIG. 9, there are six applications with four levels of priority. The PID system has supplied R-values for each of the applications which totals 164 or 164%. Since this is above the 100 or 100% allowed by the system, the arbiter 26 will have to reduce some or all of the R-values before they are sent to the PRM. Each application initially receives one share. The highest priority application, application A, requests 40 entitlement shares, since 94 shares have yet to be allocated, this application can be allocated its requested amount. Thus, application A is allocated an additional 39 shares for a total of 40. The next highest priority application, application B requests 29 entitlement shares, since 55 shares remain, this application can be allocated its requested amount. Thus, application B is allocated an additional 28 shares for a total of 29 shares. The next highest priority is priority 3, with three applications C, D, E, each of which requests 20 shares. Since only 27 shares remain, the arbiter must arbitrate the remaining shares. The current target is 20. Since the current target cannot be met, the 27 shares are divided among the applications in this priority group, i.e. each receiving an additional 9 shares for a total of 10 shares. Application F retains its one share which was initially allocated to it. Note that the prior allocation amounts are not used in calculating the new allocation values.

Figure 10A:
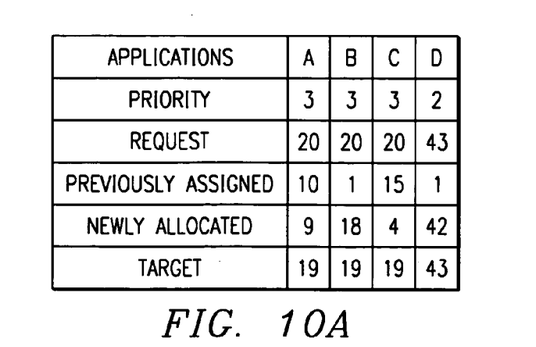
FIGS. 10A and 10B depict another example of allocation of entitlements by the work load manager of FIG. 2.
Figure 10B:
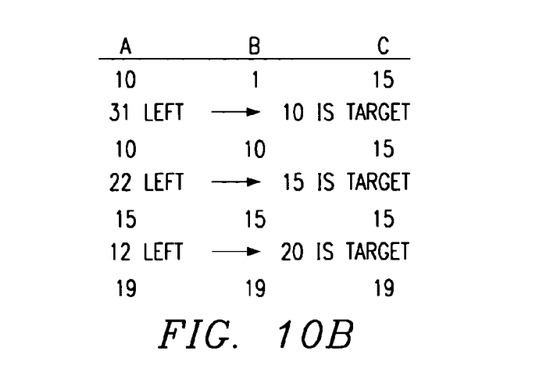

FIGS. 10A and 10B illustrate a more complex example of the operation of arbiter 26 than that of FIG. 9. Applications A and C have been allocated entitlement shares in a previous round, namely during processing of priority 1 applications. Each application initially receives one share. The highest priority applications, application A and C, requests and receive a total of 10 and 15 entitlement shares, respectively (not shown). The next highest priority application, application D requests 43 entitlement shares, since 73 shares remain, this application can be allocated its requested amount. Thus, application D is allocated an additional 42 shares for a total of 43 shares. The next highest priority is priority 3, with three applications A, B, C, each of which requests 20 shares. Note that this is a second goal for applications A and C, as higher priority goals have already been allocated shares. Since only 31 shares remain, the arbiter must arbitrate the remaining shares. The current target is 10, since the previous allocation of 10 is the lowest number of 10 (previous allocation), 15 (previous allocation), and 20 (requested amount). Since the current target can be met, application B receives 9 shares, and applications A and C are not changed. Since shares remain, the new current target is determined to be 15. Since this target can be met, applications A and B each receives 5 shares, and application C is not changed. Since shares remain, the new current target is determined to be 20. Since this target cannot be met, the remaining 12 shares are divided among the applications in this priority group, i.e. each receiving an additional 4 shares for a total of 19 shares.

Figure 11A:
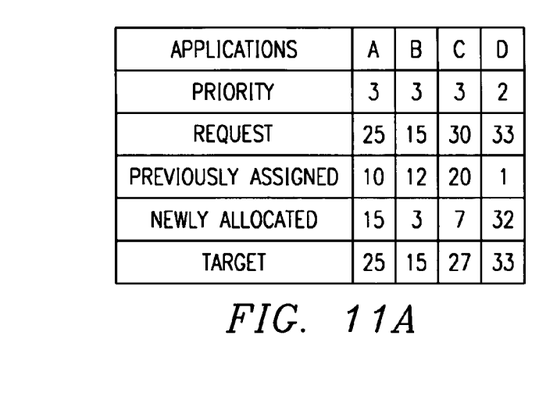
FIGS. 11A and 11B depict a further example of allocation of entitlements by the work load manager of FIG. 2.
Figure 11B:
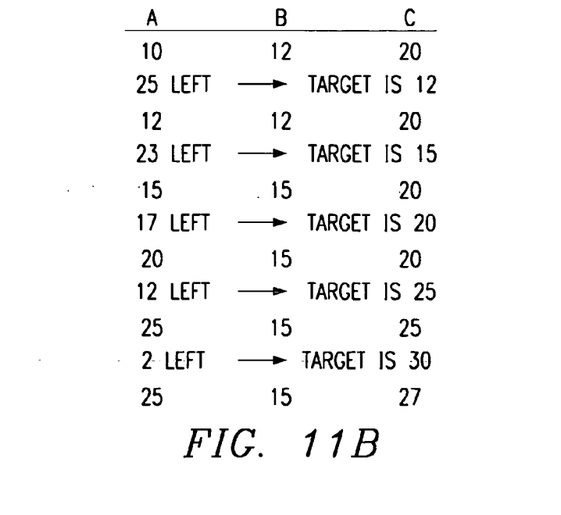

FIGS. 11A and 11B illustrate a more complex example of the operation of arbiter 26 than that of FIGS. 10A and 10B. Applications A, B, C have different requested values. Each application initially receives one share. The highest priority applications, application A B, and C, requests and receive a total of 10, 12, and 20 entitlement shares, respectively (not shown). The next highest priority application, application D requests 33 entitlement shares, since 57 shares remain, this application can be allocated its requested amount. Thus, application D is allocated an additional 32 shares for a total of 33 shares. The next highest priority is priority 3, with three applications A, B, C, which have requests of 25, 15, and 30 shares, respectively. Note that this is a second goal for applications A, B, and C, as higher priority goals have already been allocated shares. Since only 25 shares remain, the arbiter must arbitrate the remaining shares. Note that the first current target would be 10, which is the lowest of 10 (previous allocation), 12 (previous allocation), 15 (requested amount), 20 (previous allocation), 25 (requested amount), and 30 (requested amount). However, all of the applications meet or exceed this level, thus operation of the arbiter according to FIG. 8 would result in no changes, and the next lowest target of 12 would be selected. Otherwise, FIG. 8 could be modified to include such a check and thus the next lowest value of 12 would be selected as the current target instead of 10. Nonetheless, assume that one of these two steps has occurred, and the current target is determined to be 12. Since the current target can be met, application A receives 2 shares, and applications B and C are not changed. Since shares remain, the new current target is determined to be 15. Since this target can be met, applications A and B each receives 3 shares, and application C is not changed. Since shares remain, the new current target is determined to be 20. Since this target can be met, application A receives 5 shares, and application C is not changed. Note also that application B is not changed because its requested amount has been reached. Since shares remain, the new current target is determined to be 25. Since this target can be met, applications A and C each receive 5 shares, and application B is not changed. Since shares remain, the new current target is determined to be 30. Since this target cannot be met, the remaining 2 shares are divided among the applications in this priority group, i.e. application C receives 2 shares for a total of 27 shares, since A and B have met their requested amounts.

Figure 12A:
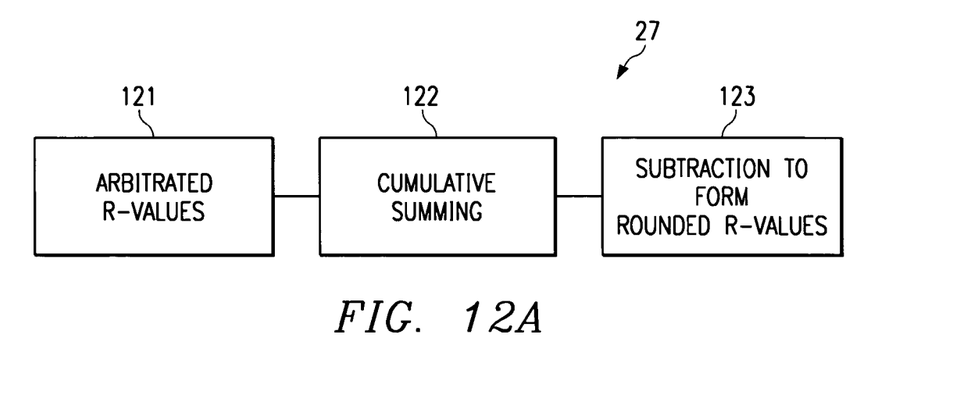
FIGS. 12A, 12B, and 12C depict the operation of the rounder of the work load manager of FIG. 3.
Figure 12B:
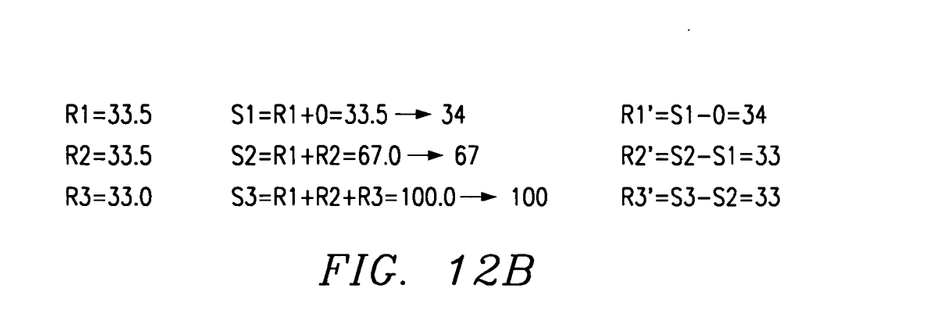

FIG. 12A depicts the operation of the rounder 27 of FIG. 3. The above examples have used integer values for the requests, allocations, and arbitrated R-values, however floating point number may be used, e.g. a R-value of 10.1. Also, floating point numbers may also result from step 814 (for example dividing 3 shares among two applications results in 1.5 shares for each application). Some systems may only operate with R-values that are integer, thus fractional values of shares will need to be rounded up or down. The rounder 27 first receives 121 the R-values from the arbiter 26. The rounder then cumulatively sums the values for each received R-value by adding prior R-values to each received R-value. The rounder then forms the rounded R-values by subtracting each cumulative sum with the prior cumulative sum. For example, as shown in FIG. 12B, three applications have R-values of R1=33.5, R2=33.5, and R3=33.0. The rounder forms S1 by adding R1 and 0 (note that step may be modified such that S1 is assigned the value of R1) and then rounding wherein fractional values of greater than or equal to 0 and strictly less than 0.5 are rounded down to zero and fractional values of greater than or equal to 0.5 are rounded up to one. Similarly, the rounder 27 forms S2 by adding R2+R1 and rounding, and forms S3 by adding R3+R2+R1 and rounding. Note that any fractional values are being accumulated into the subsequent sums (before rounding), i.e. S1 has 0.5, S2 has 1.0, and S3 also has 1.0 (before rounding). The rounder forms the rounded R-values, by subtracting the sums with the previous sum. Specifically, R1'=S1 (or S1−0), R2'=S2−S1, and R3'=S3−S2. Note that the rounding up occurs in the first value, as this is where the accumulated fractional value has equaled or exceeded 0.5.

Figure 12C:
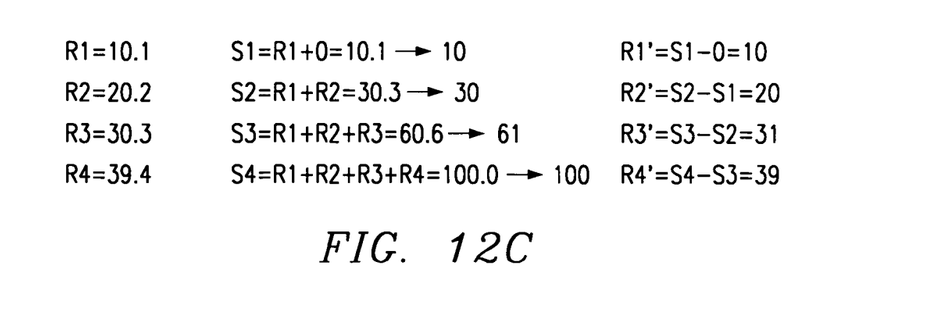

FIG. 12C is another example of rounding, wherein four applications have R-values of R1=10.1, R2=20.2, R3=30.3, and R4=39.4. The rounder forms S1 through S1=R1 (or R1+0) and rounding, forms S2 through S2=R2+R1 (or R2+S1) and rounding, forms S3 through S3=R3+R2+R1 (or R3+S2) and rounding, and forms S4 through S4=R4+R3+R2+R1 (or R4+S3) and rounding. Note that any fractional values are being accumulated into the subsequent sums (before rounding), i.e. S1 has 0.1, S2 has 0.3, S3 has 0.6, and S4 has 1.0 (before rounding). The rounder forms the rounded R-values, by subtracting the sums with the previous sum. Specifically, R1'=S1 (or S1−0), R2'=S2−S1, R3'=S3−S2, and R4'=S4−S3. Note that the rounding up occurs in the third value, as this is where the accumulated fractional value has equaled or exceeded 0.5. Note that the rounding is order dependent. Rounding tends to occur during subsequent applications, as the fractional values from several applications are usually needed to accumulate before the rounding value (i.e. 0.5) is reached. Consequently, the ordering of the applications determines which application will receive the rounding. For example, give the following fractional values of 0.4, 0, and 0.1, the third application with 0.1 will receiving the rounding up, as this accumulation value is the one that equals or exceeds 0.5, and not the larger fractional value of 0.4. If the application were re-ordered to 0, 0.1, and 0.4, then the third application with 0.4 would receive the rounding. Note that rounding does not cause significant perturbations to the inventive system, i.e. causing over/under achievements of the goals, unless the R-values are very small. In that case, increasing a small value by 1 would represent a large change in the percentage and may cause over/under achievement. For example, suppose an R-value of 2.1 is rounded up to 3. This represents a value that is 143% larger than the allocated R-value. Such a large difference may cause over/under achievement.

Note that the examples depicted and described herein are for illustrative purposes only, as the invention will operate with other values.

Further note that the allocation mechanism shown in FIG. 8 and illustrated with examples shown in FIGS. 9 to 11B, is designed such that each application within a priority group will receive generally equal treatment. Alternatives can be developed. For example, the arbiter could be programmed to attempt to maximize the number of applications that receive their request amount. This would starve some of the applications within the same priority group, particularly the larger requesting applications, so that others, namely the smaller requesting applications, will be satisfied. Another alternative is to have applications receive an amount that is proportional to the difference between their allocated amount and their requested amount. When a priority level is reached where there is an insufficiency in the available share verses the requested shares, then allocating an amount that is proportional for the difference would put each application at the same fractional point. This would minimize the number that receive the amount they are asking for because, none of the applications would receive the whole amount they are requesting (subject to rounding), they would all be scaled by their respective differences. The advantage of the mechanism of FIG. 8 is that no application is sensitive to any other application (with increasing requirements) at the same priority or lower priority. Note that a smaller requesting application may reduce a higher entitlement application, of equal priority, until their respective allocations become equal. If a higher priority application starts requesting more shares, then the lower priority application will lose shares, but if an application at the same priority starts requesting more share, then this application can reduce only the shares of its co-priority applications if its entitlement is smaller than theirs. Thus, co-priority applications are protected from each other. With the alternative mechanisms described above, a particular application's allocations will be affected as the request of their co-priority applications are changing.

Figure 4:
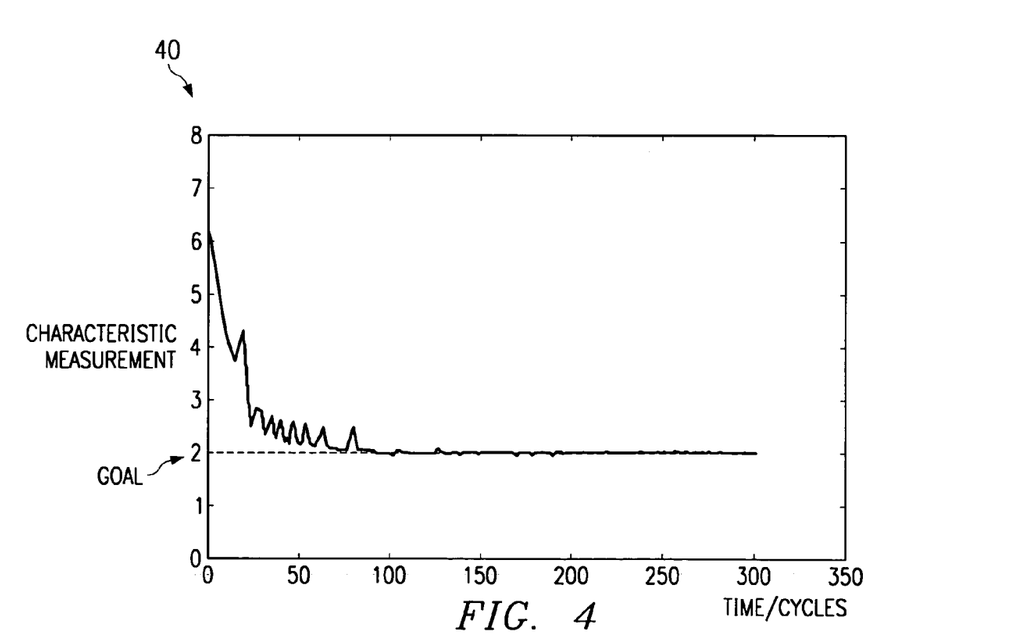
FIG. 4 depicts the inventive work load manager converging to a goal from low entitlement.

FIG. 4 depicts the service level 40 of an application and changes to the service level from operation of the invention. This application has a performance characteristic with a goal of 2. This characteristic could be time or cycles for completion. The initial entitlements were set low, and thus the characteristic exceeded the goal, which is undesirable. However, the invention increased the entitlements and thereby reduced the time characteristic down to the goal. Note that this goal is a "less than" goal, meaning that an increase in entitlement shares will reduce service level, i.e. reduce the measurement. Further note, that if the goal is a "greater than" goal, meaning that an increase in entitlement shares will increase the service level, then FIG. 4 can be viewed as a case where the initial entitlements were set high, and the invention decreased the entitlements and reduced the characteristic down to the goal.

Figure 5:
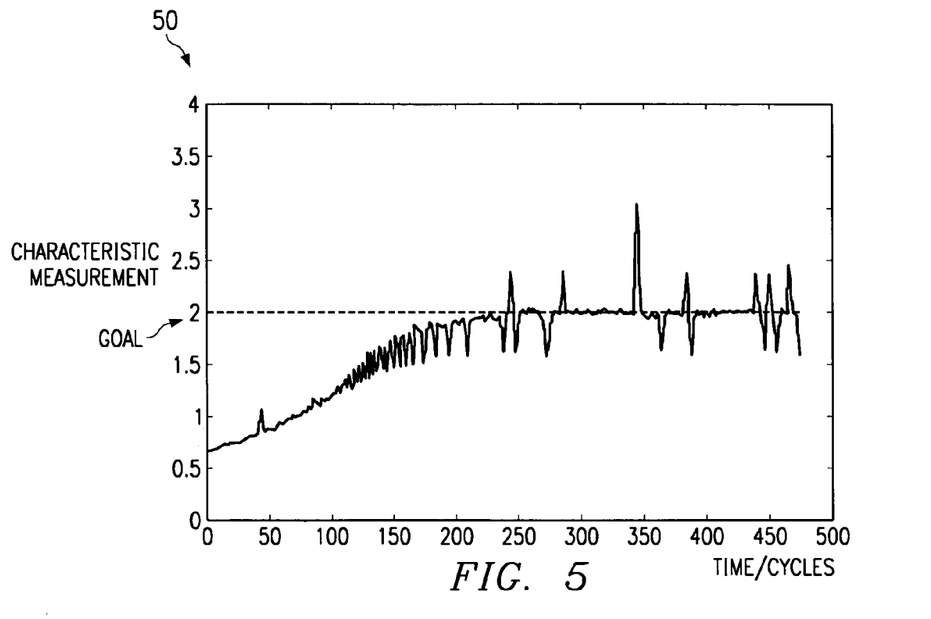
FIG. 5 depicts the inventive work load manager converging to a goal from high entitlement.

FIG. 5 depicts the service level 50 of an application and changes to the service level from operation of the invention. This application has a performance characteristic with a goal of 2. This characteristic could be time or cycles for completion. The initial entitlements were set high, and thus the characteristic was less (better) than the goal. However, the invention decreased the entitlements and thereby increased the time characteristic up to the goal. Note that this goal is a "less than" goal, meaning that an increase in entitlement shares will reduce service level, i.e. reduce the measurement. Further note, that if the goal is a "greater than" goal, meaning that an increase in entitlement shares will increase the service level, then FIG. 5 can be viewed as a case where the initial entitlements were set low, and the invention increased the entitlements and raised the characteristic up to the goal.

Figure 6:
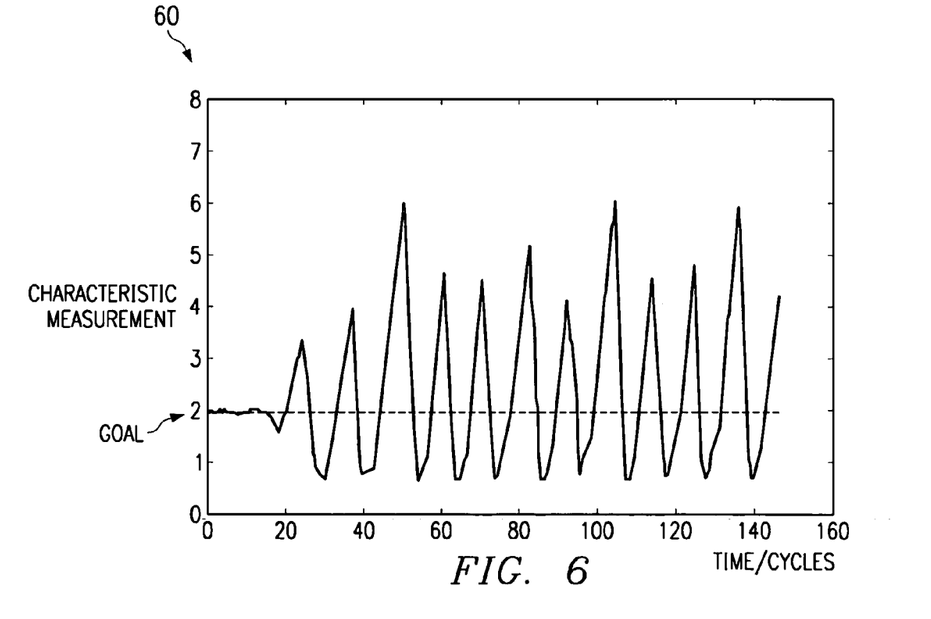
FIG. 6 depicts an instability from excessive tuning for the proportional controller.

Both FIGS. 4 and 5 depict circumstances where an initial entitlement yielded performance results that are different from the stated goal; however, in a relatively short period of time, the goal is reached. Consequently, the initial settings for the entitlements becomes less important as the invention will quickly adjust the entitlement to meet the goal. However, the tunings for the PID controller are important, particularly KP. As shown in FIGS. 4 and 5, adjustments are made step by step, gradually, and the severity of the change is governed by the KP quantity. The invention makes big changes at first, and slowly begins getting closer and closer to the goal. If KP is set too low, then the invention will take a longer time to reach the goal, i.e. the smaller KP means slower convergence. Thus, the larger KP the faster the convergence. Fast convergence is more desirable, of course, to the user. However, if KP is set too high, then an unstable application may result. FIG. 6 depicts an application operating on the invention with KP set too high. Consequently, the invention 'over corrects' for the differences between the measurement and the goal, and is oscillating around the goal. Therefore, if the system is not responding quickly enough, the user may want to increase KP, while if the system is prone to instability, then KP can be reduced.

The following discusses the selection of the KP constant. Selection of the KI and KD constants can be readily performed based on the information contained herein, as well as that of the reference by Benjamin C. Kuo entitled "Automatic Control Systems", $4^{th}$ ed., 1982, Prentice-Hall Inc., Englewood Cliffs, N.J., 07632, ISBN 0-13-054817-0, which is incorporated herein by reference, particularly chapter 8.2.

Two points are of interest when choosing KP. These points are the service levels U and L, which represent the upper and lower bounds on the service levels. Note that for a service level based on time or "less than", U is effectively infinite, since the service level becomes arbitrarily large as the entitlement approaches zero. Hence, to get a reasonable upper bound, we must choose a more limited range of points we are interested in. The upper and lower service levels, U and L are identified, as well as Eu and El, which are the entitlements at which the upper and lower service levels are achieved. In the example from above, we had a workload that we expected to produce two-second transactions when given a portion of the CPU entitlements. Empirical data from this workload suggests that it has an asymptote around zero shares or the service level increases without bound as entitlement approaches zero. So suppose that we limit our region of interest to the range of entitlements starting at ten entitlement shares. This corresponds to service levels below roughly six seconds, under the workload conditions in the experiment. In this example, we wind up with the following parameter values: U=6.00, L=0.068, Eu=10, and El=99.

It is asserted that if KP is larger than 2/M, where M is the absolute value of the slope of the performance curve near the goal G, then the system will not converge to the goal. Note that the following calculations assume a "less-than" goal, however the calculations for a "greater-than" goal are similar. Since we are considering points near the goal, the performance curve in this region can be expressed as S(e)= G+M*(Eg−E), where Eg represents the entitlement that corresponds to the goal. Suppose KP is larger than 2/M. Also, suppose the service level is currently S and the entitlement is E. This will result in an entitlement change of (KP*(S−G)) shares. That is, the new entitlement will be:

$$Enew=E+(KP*(S-G))$$

Given the above performance curve formula, we also know:

$$S=G+M*(Eg-E)$$

Instability will result if Enew is further from Eg than E was.

That is, if:

$$|Enew-Eg|>|E-Eg|$$

This is equivalent to:

$$|Enew-Eg|>|E-Eg|$$

$$|E+(KP*(S-G))-Eg|>|E-Eg|$$

$$|E+(KP*((G+M*(Eg-E))-G))-Eg|>|E-Eg|$$

$$|E-Eg+(KP*M*(Eg-E))|>|E-Eg|$$

$$|(1-KP*M)*(E-Eg)|>|E-Eg|$$

$$|(1-KP*M)|*|(E-Eg)|>|E-Eg|$$

$$|(1-KP*M)|>1$$

That is, if |1−KP*M|>1, then the entitlement "error" will be bigger than before, and therefore the system will be unstable.

Now if KP>2/M, then:

$$KP*M>2$$

$$KP*M-1>2-1=1$$

$$|KP*M-1|>1$$

As we showed above, this condition implies that the system will be unstable. Similar calculations can be used to show the same result for a "greater-than" workload. Hence, if KP is larger than 2/M, the system will not converge to the goal, since the entitlement will always move further from the goal value.

The following describes an upper bound for KP. Recall the parameters U, L, Eu, and El that we computer for our workload. If we assume the performance curve is continuous, then by intermediate value theorem, there must be some point Em between El and Eu at which the slope of the performance curve is (U−L)/(Eu−El). So if the goal is set to the service level which corresponds to Em, then from the above equations, the system will be unstable for any value of KP larger than 2|(Eu−El)/(U−L)|. So the following constraint is recommended:

$$KP<2|(Eu-El)/(U-L)|$$

Following this limit will avoid creating a scenario where a goal can be chosen between L and U which is certain to lead to instability. Note, however, that this does not guarantee stability for all goal values and all KP values less than this limit. In fact, it is likely that KP values near this limit will still result in an unstable system. This limit tells us how to avoid configurations that are definitely unstable. It also gives an initial sense of how large KP should be, e.g. whether it should be around a million or a millionth.

For the example values we determined above, we get the following bound for KP:

$$KP<2|(10-99)/(6.00-0.68)|=33.46$$

This means that to get reasonable behavior for all goals under six seconds, we should avoid setting KP to a value bigger than 33.46.

The following describes a starting point for KP. The upper bound we have determined is of limited use, since it only tells us values that should not be chosen. Choosing an actual value requires deciding how aggressively to tune the system, weighing the trade-off between stability and timely resource adjustments. One way to estimate an appropriate value for KP is to analyze the system as if it is a continuous linear system.

Again, suppose the performance curve is given by the simple formula S(e)=G+M*(Eg−E). For this computation, we need a time-independent representation of the rate at which we change service levels. Let K represent the entitlement change per second, given a service level error of 1. So if the data collector is reporting data within every interval, K would be KP/wlm_interval (which is the collection or reconfiguration interval of the wlm). So for any interval of time delta_t, the entitlement will be adjusted by roughly K*delta_t*(S−G). The resulting change in service level will be:

$$delta\_S=Snew-S+(G+M*(Eg-Enew))-(G+M*(Eg-E))$$

$$=M*(Eg-Enew-Eg+E)$$

$$=M*(E-Enew)$$

$$=M*(E-(E+K*delta\_t*(S-G)))$$

$$=M*(K*delta\_t(G-S))$$

So $$delta\_S/delta\_t=M*K*(G-S)$$

Taking the limit as delta_t goes to zero, we have:

$$S'=M*K*(G-S)$$

This differential equation can be rewritten as:

$$S'+M*K*S-M*K*G=0$$

The solution to this differential equation is:

$$S(t)=G+B*e\char`\^(-M*K*t)$$

where B is a constant whose value is determined by the initial conditions. Specifically, when t=0, we have S(t)=G+B, so B represents the initial deviation from the goal. To make use of this formula, it is necessary to quantify our desired rate of convergence. One way to represent the rate of convergence is to consider how long the system should take to converge to within ten percent of the goal. For example, if we want the workload to get within ten percent of the goal in under two minutes (120 seconds), then we want the following:

$$|S(120)-G|<0.1*G$$

This is equivalent to:

$$|G+B*e\char`\^(-M*K*(120))-G|<0.1*G$$

$$|B*e\char`\^(-M*K*(120))|<0.1*G$$

We now need to place bounds on the value of B. We expect the service levels to fall between L and U. The goal falls between these values as well. Since B represents the deviation from the goal at t=0, B can be at most |U−L|. Therefore:

$$|B|*e\char`\^(-M*K*(120))|<|U-L|*e\char`\^(-M*K*(120))|$$

So if we ensure that the right hand side above is less than (0.1*G), the convergence will be within the desired time. So we are trying to achieve:

$$|U-L|*e\char`\^(-M*K*(120))|<0.1*G$$

which is equivalent to:

$$e^{\wedge}(-M*K*(120))|<0.1*G/|U-L|$$

$$-M*K*(120)|<\ln(0.1*G/|U-L|)$$

$$K>-\ln(0.1*G/|U-L|)/(120*M)$$

As before, we can use |(U−L)/(Eu−El)| as an approximation for M. Since any K satisfying the above will provide the desired level of convergence in the desired time, we can choose the smallest (most conservative) such K:

$$K=-\ln(0.1*G/|U-L|)*(Eu-El)/(120*(U-L))|$$

For the specific example we have been using, we get the following value, supposing a goal of two seconds:

$$K=-\ln(0.1*2/|6.00-0.68|)*(10-99)/(120*(6.00-0.68))$$
$$|=0.4574$$

The general formula for any time interval T (120 seconds above) and accuracy A (0.1 above) is:

$$K=-\ln(A*G/|U-L|)*|(Eu-El)/(T*(U-L))|$$

To determine KP, we need to scale K for time. Let J be the average number of seconds between entitlement changes for the workload. This may or may not be wlm_interval, depending on how often the data collector reports data. As we observed earlier, $$K=KP/J$$

Hence, $$KP=K*J$$

In summary, given the following parameters: U=Maximum expected service level, L=Minimum expected service level, Eu=Entitlement producing service level U, El=Entitlement producing service level L, G=Service level goal, T=Desired convergence time (in seconds), A=Error (as percentage of G) within time T, and J=Average number of seconds between entitlement changes, then a reasonable initial estimate for KP is:

$$KP=-\ln(A*G/|U-L|)*|(Eu-El)/(J*T*(U-L))|$$

Note that the ln( ) in this expression is the natural logarithm, with base e. This formula can be rewritten with the "common" base-ten logarithm as follows:

$$KP=-2.30259*\log(A*G/|U-L|)*|(Eu-El)/(J*T*(U-L))|$$

Because of the oversimplifications made in the calculations that led to this formula, this initial value of KP may need to be fine-tuned to produce the desired behavior. However, it serves as a reasonable starting point.

Note that the term 'application' as used in the specification is a collection of processes. An example of an application is a database server, which may be one or more processes that are handling database lookup, store, database requests, etc. PRM includes a mechanism to describe which processes should be associated with an application based on characteristics such as what program they are running or what user is running them. There is also a way to manually say "run this process in a particular group." Consequently, an application is any collection of code that performs a function for a user or program, e.g. operating system. Example of applications are, but not limited to MS Word, Oracle, Apache WebServer, a utility such as SAP, or BAAN.

Figure 7:
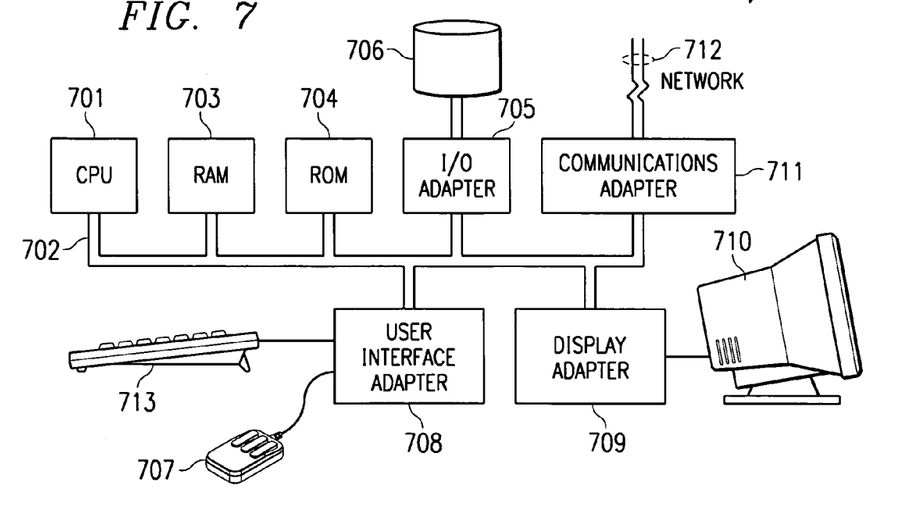
FIG. 7 depicts a block diagram of a computer system which is adapted to use the present invention.

FIG. 7 illustrates computer system 700 adapted to use the present invention. Central processing unit (CPU) 701 is coupled to system bus 702. The CPU 701 may be any general purpose CPU, such as an HP PA-8200 or Intel Pentium II processor. However, the present invention is not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

The bus 702 is also coupled to input/output (I/O) controller card 705, communications adapter card 711, user interface card 708, and display card 709. The I/O card 705 connects to storage devices 706, such as one or more of hard drive, CD drive, floppy disk drive, tape drive, to the computer system. Communications card 711 is adapted to couple the computer system 700 to a network 712, which may be one or more of local (LAN), wide-area (WAN), Ethernet or Internet network. User interface card 708 couples user input devices, such as keyboard 713 and pointing device 707, to the computer system 700. The display card 709 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system managing allocation of computer resources among a plurality of applications operating on a computer, based upon at least one user-defined goal for the plurality of applications and application performance information related to each of the plurality of applications, the system comprising:

a calculator that determines an allocation request value using a proportional factor, an integral factor, and a derivative factor, wherein the factors are calculated from the at least one user-defined goal and the performance information; and an arbiter that is operative to adjust the allocation request value into an adjusted allocation value, based on a user-selectable priority for each of the plurality of applications, and also when the allocation request value and allocation request values associated with other applications exceeds a predetermined value.

2. The system of claim 1, wherein:

the proportional factor includes a proportional constant and a proportional variable, wherein the proportional constant is a user-selectable input, and the proportional variable is determined from the at least one user-defined goal and the performance information;

the integral factor includes a integral constant and a integral variable, wherein the integral constant is a user-selectable input, and the integral variable is determined from the at least one user-defined goal and the performance information; and the derivative factor includes a derivative constant and a derivative variable, wherein the derivative constant is a user-selectable input, and the derivative variable is determined from the at least one user-defined goal and the performance information.

3. The system of claim 2, wherein:

the proportional factor is (KP×$P_i$*), wherein KP is the proportional constant and $P_i$* is the proportional variable, and $P_i$*=$P_i$−$V_i$, wherein $P_i$ is performance information and $V_i$ is the at least one user-defined goal;

the integral factor is (KI×$I_i$), wherein KI is the integral constant and $I_i$ is the integral variable, and $I_i$=($I_i$old× $IH_i$)+$P_i$*, $I_i$old is a previous value for $I_i$, and $IH_i$ is an integral history constant which is a user-selectable input, and $P_i$* is the proportional variable; and the derivative factor is (KD×$D_i$), wherein KD is the derivative constant and $D_i$ is the derivative variable, and $D_i$=($P_i$*−$P_i$*old)/t, wherein $P_i$* is the proportional variable, $P_i$*old is a previous value for $P_i$*, and t is a time between the performance information used to calculate $P_i$* and previous performance information used to calculate $P_i$*old.

4. The system of claim 3, wherein:

the allocation request value, $R_i$, is determined by $R_i$=(KP× $P_i$*)+(KD×$D_i$)+(KI×$I_i$)+$R_i$old, wherein $R_i$old is a previous value for $R_i$.

5. The system of claim 1, wherein a number format for each of the at least one user-defined goal, the performance information, and the allocation request value is selected from the group consisting of:

a floating point number, and an integer number.

6. The system of claim 1, wherein the allocation request value is a floating point number, the system further comprising:

a rounder that uses cumulative rounding to adjust the floating point allocation request value into an integer number.

7. The system of claim 1, wherein:

the performance information is generated by a performance monitor that monitors a characteristic of the application associated with the at least one user-defined goal.

8. The system of claim 1, wherein:

the allocation request value is used by a process resource manager to allocate computer processing resources among the applications operating on the computer.

9. The system of claim 1, wherein:

the arbiter determines whether each application of the plurality of applications having the same priority can be allocated resources to equal its associated allocation request value, if so, then the arbiter forms the adjusted allocation request value for each application by equaling the adjusted allocation request value to the allocation request value, and if not, then the arbiter determines whether each application of the plurality of applications having the same priority can be allocated resources to equal a target value.

10. The system of claim 9, wherein:

the target value is selected by the arbiter from the lowest of a previously allocated request value, which has not been previously selected as a target value, and an allocation request value of an application of the plurality of applications having the same priority, which has not been previously selected as a target value.

11. The system of claim 9, wherein:

the arbiter forms the adjusted allocation request value for each application by equaling the adjusted allocation request value to the target value, if the arbiter determines that each application of the plurality of applications having the same priority can be allocated resources to equal the target value.

12. A computer program product having a computer readable medium having computer program logic recorded thereon for managing allocation of computer resources among applications operating on a computer, based upon at least one user-defined goal for at least one application and application performance information related to the at least one application, the computer program product comprising:

code for determining an allocation request value using a proportional factor, an integral factor, and a derivative factor, wherein the factors are calculated from the at least one user-defined goal and the performance information; and code for adjusting the allocation request value based on a user-selectable priority for the at least one application, and when the allocation request value and allocation request values associated with other applications exceeds a predetermined value.

13. The computer program product of claim 12, wherein:

the proportional factor includes a proportional constant and a proportional variable, wherein the proportional constant is a user-selectable input, and the proportional variable is determined from the at least one user-defined goal and the performance information;

the integral factor includes a integral constant and a integral variable, wherein the integral constant is a user-selectable input, and the integral variable is determined from the at least one user-defined goal and the performance information; and the derivative factor includes a derivative constant and a derivative variable, wherein the derivative constant is a user-selectable input, and the derivative variable is determined from the at least one user-defined goal and the performance information.

14. The computer program product of claim 13, wherein:

the proportional factor is (KP×$P_i$*), wherein KP is the proportional constant and $P_i$* is the proportional variable, and $P_i$*=$P_i$−$V_i$, wherein $P_i$ is performance information and $V_i$ is the at least one user-defined goal;

the integral factor is (KI×$I_i$), wherein KI is the integral constant and $I_i$ is the integral variable, and $I_i$=($I_i$old× $IH_i$)+$P_i$*, $I_i$old is a previous value for $I_i$, and $IH_i$ is an integral history constant which is a user-selectable input, and $P_i$* is the proportional variable; and the derivative factor is (KD×$D_i$), wherein KD is the derivative constant and $D_i$ is the derivative variable, and $D_i$=($P_i$*−$P_i$*old)/t, wherein $P_i$* is the proportional variable, $P_i$*old is a previous value for $P_i$*, and t is a time between the performance information used to calculate $P_i$* and previous performance information used to calculate $P_i$*old.

15. The computer program product of claim 14, wherein:

the allocation request value, $R_i$, is determined by $R_i$=(KP× $P_i$*)+(KD×$D_i$)+(KI×$I_i$)+$R_i$old, wherein $R_i$old is a previous value for $R_i$.

16. The computer program product of claim 12, wherein the at least one application is one of a plurality of applications, wherein the code for adjusting the allocation request value comprises:

code for determining whether each application of the plurality of applications having the same priority can be allocated resources to equal its associated allocation request value, if so, then the adjusted allocation request value for each application is formed by equaling the adjusted allocation request value to the allocation request value, and if not, then whether each application of the plurality of applications having the same priority can be allocated resources to equal a target value is determined;

wherein the target value is selected from the lowest of a previously allocated request value, which has not been previously selected as a target value, and an allocation request value of an application of the plurality of applications having the same priority, which has not been previously selected as a target value.

17. The computer program product of claim 16, wherein the code for adjusting the allocation request value further comprises:

code for forming the adjusted allocation request value for each application by equaling the adjusted allocation request value to the target value, if each application of the plurality of applications having the same priority can be allocated resources to equal the target value.

18. A method for managing allocation of computer resources among applications operating on a computer, based upon at least one user-defined goal for at least one application, a priority associated with the at least one application, and application performance information related to the at least one application, the method comprising the steps of:

determining an allocation request value using a proportional factor, an integral factor, and a derivative factor, wherein the factors are calculated from the at least one user-defined goal and the performance information; and adjusting the allocation request value based on the relative priority between applications, and also when the allocation request value and allocation request values associated with other applications exceeds a predetermined value.

19. The method of claim 18, wherein the at least one application is one of a plurality of applications, and the priority of each application of the plurality is user-selectable, wherein the step of adjusting the allocation request value comprises the step of:

determining whether each application of the plurality of applications having the same priority can be allocated resources to equal its associated allocation request value, if so, then the adjusted allocation request value for each application is formed by equaling the adjusted allocation request value to the allocation request value, and if not, then whether each application of the plurality of applications having the same priority can be allocated resources to equal a target value is determined, wherein the target value is selected from the lowest of a previously allocated request value, which has not been previously selected as a target value, and an allocation request value of an application of the plurality of applications having the same priority, which has not been previously selected as a target value.

20. The method of claim 19, wherein the step of adjusting the allocation request value further comprises the step of:

forming the adjusted allocation request value for each application by equaling the adjusted allocation request value to the target value, if each application of the plurality of applications having the same priority can be allocated resources to equal the target value.

* * * * *

UNITED STATES PATENT AND TRADEMARK OFFICE
CERTIFICATE OF CORRECTION

PATENT NO.          : 7,228,546 B1
APPLICATION NO. : 09/493753
DATED                   : June 5, 2007
INVENTOR(S)        : Clifford A. McCarthy et al.

It is certified that error appears in the above-identified patent and that said Letters Patent is hereby corrected as shown below:

In column 6, line 23, delete "$(T_i \text{old} \times IH_i)$" and insert -- $(I_i \text{old} \times IH_i)$ --, therefor.

In column 15, line 12, delete "$(Eu–El)/(120*(U–L))|$" and insert -- $|(Eu-El)/(120*(U-L))|$ --, therefor.

Signed and Sealed this

Twenty-second Day of December, 2009

David J. Kappos
*Director of the United States Patent and Trademark Office*